US008620774B1

(12) United States Patent
Li et al.

(10) Patent No.: US 8,620,774 B1
(45) Date of Patent: Dec. 31, 2013

(54) AUTOMATED MARKETPLACE MANAGEMENT SERVICE

(75) Inventors: Gregory Michael Li, Seattle, WA (US);
Morgan K. Akers, Kirkland, WA (US);
Jacob S. Carr, Seattle, WA (US);
Brandon W. Porter, Auburn, WA (US)

(73) Assignee: Amazon Technologies, Inc., Reno, NV (US)

( * ) Notice: Subject to any disclaimer, the term of this patent is extended or adjusted under 35 U.S.C. 154(b) by 199 days.

(21) Appl. No.: 12/889,012

(22) Filed: Sep. 23, 2010

(51) Int. Cl.
*G06Q 30/00* (2012.01)

(52) U.S. Cl.
USPC ........................................ 705/27.1

(58) Field of Classification Search
USPC .................. 705/26–27, 26.1–27.2
See application file for complete search history.

(56) References Cited

U.S. PATENT DOCUMENTS

2003/0110098 A1* 6/2003 Wirth, Jr. ..................... 705/27
2005/0114226 A1* 5/2005 Tripp et al. .................... 705/26
2006/0015591 A1* 1/2006 Datla et al. .................... 709/220
2009/0138940 A1* 5/2009 Liu et al. ........................ 726/1

OTHER PUBLICATIONS

Kumar, P., Kashyap, S., Mittal, A., and Gupta, S., "A Fully Automatic Question-Answering System for Intelligent Search in E-Learning Documents" (Int'l J. on ELearning 4.1, 2005, 149-166).*

* cited by examiner

*Primary Examiner* — Jeffrey A Smith
*Assistant Examiner* — Ethan D Civan
(74) *Attorney, Agent, or Firm* — Lee & Hayes, PLLC

(57) ABSTRACT

Techniques described herein provide a self-service, run-time configuration store for interaction between a business owner and a Web service. For instance, the techniques may receive entity-specific configuration data from a business entity, may validate and store the entity-specific configuration data in a central location, and may receive a service-specific schema definition from a Web service. In response to a command to push the validated configuration data, or in response to a request to pull the validated configuration data, the techniques serve the entity-specific configuration data to configure the Web service for use with customers of the business entity.

29 Claims, 8 Drawing Sheets

CENTRAL LOCATION 700

AUTOMATED MARKETPLACE MANAGEMENT SERVICE

BACKGROUND

In the world of e-commerce, many different types of businesses and organizations perform a multitude of different tasks. For instance, one business may sell products, another business may sell services, and yet another business may sell both products and services. Even still, some business may manufacture products from raw materials (or materials produced by others) and, thus, may perform more purchasing and receiving type tasks than other businesses. Some may be brick and mortar businesses in that they have a physical presence, such as a store, while others may be primarily accessible by computers over a network such as the Internet. Additionally, some organizations may merely provide services to their users, such as educational institutions or the government, with less emphasis on sales.

More specifically, businesses and organizations may perform tasks such as collecting and organizing customer information, receiving payments, fulfilling orders, shipping products, or even receiving returned items. Fortunately, there are services that may be able to help perform these tasks. While some services are operated by brick and mortar business, as noted above, others may come in the form of Web applications, or Web services. For instance, a Web service may provide payment collection services by facilitating credit card payments from customers of a business over the Web. In this way, a business tasked with receiving payments for orders may rely on a Web service for this collection. Some services may perform many different tasks and, yet, some services may perform only one or two tasks. Other tasks that can be performed by services, or Web services, may include collecting customer information, fulfilling orders, organizing shipping, and the like, or any other task that a business or organization may perform.

In addition, each business or organization may prefer to set their own policies for interaction with customers or users. For instance, while one business may allow users to create unique user identifiers (IDs) based on any combination of letters and numbers, another business may only allow users to register using an existing email address. In another example, some businesses may operate in English only, while other businesses may provide products and/or services in many languages. In other words, each business or organization may uniquely determine its own set of configuration rules for each task that it may perform.

Based on the particular needs of each business, different entities may want to acquire the assistance of different services. As such, each entity may interact with many different services in order to effectively operate for a variety of different reasons. For instance, one entity may prefer to use a service for collecting payments and fulfilling orders (e.g., a brick and mortar store), another entity may prefer to utilize catalog services for displaying products to potential on-line customers (e.g., a Web store), and yet another entity may prefer to only use a service for collecting and organizing user information (e.g., an educational institution). Thus, each entity may have a unique set of services that it has enlisted for performing tasks, and a unique set of configurations for each service.

Further, each service may have its own set of specific configuration rules for the businesses to follow. For instance, a service for collecting and organizing user information may have a rule pertaining to the number of special characters per password. Alternatively, a service for shipping products may allow shipment to any country in North America or Europe. As such, each service may uniquely determine its own set of configuration rules for accessing and/or utilizing its functionality.

However, in order to maintain the unique configuration requirements of each business securely, such as payment options or the like, configuration data for each individual business may be stored locally by the services. Thus, as commerce grows, particularly e-commerce, and more businesses request the aid of service providers (including Web services), services may find it more and more difficult to maintain and manage configuration information. Moreover, as businesses often change configuration policies rapidly, request new services, and grow, the services they use may prefer to be more dynamic. As more businesses request more services, existing services may find it ineffective to continue to store the configuration data locally. Unfortunately, the current system may be too inflexible and decentralized to handle further growth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed, in part, to techniques for receiving and storing configuration information from a multitude of business entities. This disclosure is also related to serving the configuration information to service providers that provide services to the business entities for interacting with customers. By doing so, the techniques allow for management of entity-specific configuration data at a central location, while still allowing different service providers to regulate their own respective configuration rules. For instance, a central location may include at least one server that maintains configuration files from a business entity for an authentication service, an address management service, a payment options service, or any other similar or different services that may be utilized by multiple different business entities for selling products and/or providing services to customers.

As such, when an owner or agent of a business entity requests to update or create its configuration information for particular services, the owner or agent need only interact with the central location, as opposed to each service provider individually. Further, the central location server may provide the business entity with a Web service user interface (UI) for updating/creating configuration files. The business entity may then operate this UI to provide the configuration file directly to the central location. Conversely, the business entity may provide this configuration file to the central location in any other manner, such as by writing code that effectively serves the configuration file to the central location. This entity-specific configuration file may include contact configuration information, payment configuration information, catalog configuration information, different configuration information, or the like. Additionally, each of a multitude of business owners may own a set of unique configuration files. As such, each business utilizing the central location may have a unique configuration file that specifies different services and/or different configurations for these services.

After the central location receives a unique configuration file from a business entity, the central location may parse this file and serve the entity-specific configuration information to the appropriate service providers. The central location may similarly send this information in response to receiving an update to the configuration file, in response to customer actions, or in response to a request for information from the service provider. In this way, configuration information can be either pushed to or pulled from the service providers, depending on the use case. For instance, performance critical services, such as search indexing or the like, can listen to the central location for important changes to the searching configuration information of each business utilizing the search service. When a change occurs to one or more configuration files that affects the search service, the search service may pull the updated configuration file(s) rather than waiting for the central location to push this information to the search service. As such, the search service may update a search index prior to a customer attempting to search a business's catalog(s).

In some instances, the configuration files may contain time-to-live (TTL) data that can be used by the service providers for effectively caching the configuration information. For instance, a particular configuration file may use a hypertext transfer protocol (HTTP) cache header to signify that the information within the file is only valid for one day. As such, when the service provider accesses the configuration file, the service provider may set a particular caching policy for that configuration information based on this period of time. For example, if the TTL data signifies that the configuration file is only valid for one day, the caching policy may request an updated configuration file each day. Thus, the service provider may perform optimally by either using the cached information or by requesting updated information based on the caching policy. In one example, TTL data may be set by the central location, by business owners, or dynamically based on prior use history (e.g., based on how often business owners change the particular configuration file). In another example, TTL data may be set to a default time, such as five minutes. In yet another example, a service provider may store a default TTL value in the central location, in which case the central location may populate an HTTP caching header of an XML file with the stored TTL value. Additionally, other caching technologies may be used as well.

In other instances, the service providers may include a management client for interacting with the central location. The management client may facilitate interaction between the service providers and the central location such that each service provider can communicate with the central location regardless of the service provider's language. For instance, one service provider may be written using Java™, while another service provider may be written using C++. However, since the management client can communicate with the central location independent of the service providers' native language, each service provider can access the central location and interpret the caching headers.

In addition, the configuration files received by the central location can be validated prior to being stored in some instances. In some instances, the configuration files comprise extensible markup language (XML) files, in which case the central location may both syntactically and semantically validate the files using service-provided XML schema definition (XSD) files and service provider call-backs. For instance, the central location may syntactically validate each XML file by checking the file against the received XSD file for each service provider. In this way, the syntax of the entity-specific configuration requirement can be approved. For instance, if a business owner requires that payment be made by either VISA™ or Mastercard™, the central location can check the payment service's XSD file to ensure that VISA™ and Mastercard™ are valid options (i.e., that they exist on the master list).

Additionally, the central location may provide semantic validation of each XML file by calling-back to the appropriate service provider to determine if the semantics of the configuration requirement is correct. For instance, certain user IDs may not be approved by the contact service provider and the call-back may request that the contact service determine whether an approved user ID of a customer, located within a configuration file, is allowed by the contact service provider.

With these techniques, in one example a business owner may store a configuration file at a central location. The central location may validate the syntax of the configuration file, and if necessary, call-back to the appropriate service provider to validate its semantics. Once validated, the configuration file may be stored in the central location for serving to the appropriate service provider.

In one example, the validated and stored configuration file may be pushed to the appropriate service provider immediately or in response to a notification of an updated configuration file. Alternatively or additionally, the central location may store the configuration file until a pull request is made by a service provider. For instance, a service provider may be listening for changes to a specific configuration file and may make a pull request for the information once it is updated, or at pre-specified time intervals. Based on a caching policy, and/or TTL data, the service providers may dynamically update with a business entity's configuration requirements. The service providers may then perform their service to the appropriate customer of the business.

In some instances, a business owner may choose to utilize all of the service providers available through the central location. However, some business owners may choose to use only a subset of the available services. For example, a brick-and-mortar store may choose to interact with the central location to take advantage of a payment service provider for accepting on-line credit card payments. However, they may handle their contacts, shipping, fulfillment of orders, etc. on their own. As such, they may only need to provide one configuration file because they are only setting configurations for a single service provider. In this way, the central location may be externalized and accessible to any business. On the other hand, a full-service Web-store (or marketplace) may choose to take advantage of each available service provider and, as such, may provide a configuration file (or set configuration requirements through a user interface) for each available service provider.

In other instances, the central location may be accessible by Web clients over a public or private network. Additionally, as noted above, the central location may be accessible through a Web service interface over a public or private network. In these instances, business owners may access Web clients, provide configuration information independently, or access the Web service interface over a network such as the Internet.

Furthermore, the central location may be configured to codify a set of business rules into a configuration file on the behalf of a business owner. For instance, a business owner may develop a set of marketplace-specific rules for determining how to detect fraudulent orders. The central location may, in turn, create a configuration file for the business owner that codifies the fraud detection rules into executable configuration information such that a service may perform fraud detection for the business owner. As such, each business owner may submit a set of business rules to the central location for codification into a configuration file.

The techniques described above and below may be implemented in a number of ways and in a number of contexts. Several example implementations and contexts are provided with reference to the following figures, as described below in more detail. However, the following implementations and contexts are but a few of many.

Illustrative Architectures

Figure 1:
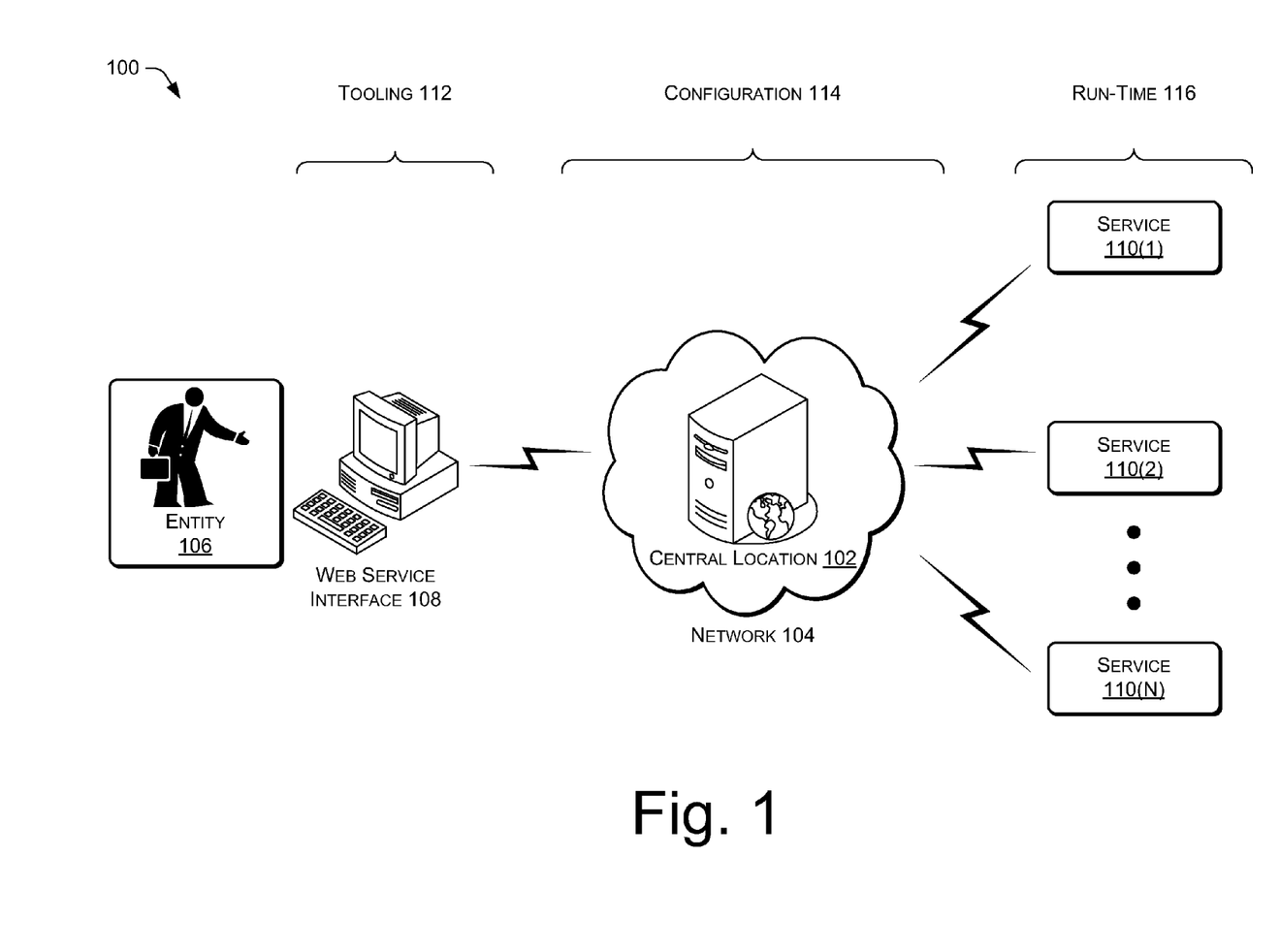
FIG. 1 illustrates an example architecture that includes a central location that maintains a service for multiple different business entities and multiple different services. The central location may receive configuration data through a Web service interface and may serve the configuration data to the multiple different services.

FIG. 1 illustrates an example architecture 100 in which a central location server 102 receives and serves configuration information over a network 104. For instance, the central location server 102 may receive entity-specific configuration information from an entity 106 via a Web service interface 108. Alternatively, entity-specific configuration information may be sent directly from entity 106 without the use of the Web service interface 108. In this way, a variety of implementations for receiving the configuration information at the central location server 102 are possible. Additionally, the central location server 102 may store the configuration information for subsequent use and/or processing, and may serve the configuration information to any number of services 110 (1), 110(2), through 110(N).

In one example, the entity 106 may be a business entity 106 entering business-specific configuration requirements over the network 104. For instance, business-specific configuration requirements may include, but are not limited to, customer contact information configurations, payment requirement configurations, fulfillment configurations, shipping configurations, feedback configurations, other requirement configurations, combinations of the foregoing, or the like. In another example, country-specific configurations or seller-of-records-specific configurations could be stored in the central location server 102, along with or instead of business-specific configurations. Additionally, the central location server 102 may provide the Web service interface 108 for the business-specific requirements to be entered. Alternatively, the business entity 106 may enter the business-specific configuration information by any other means, such as by providing a configuration file directly to the central location server 102 or writing code to communicate directly with the central location server 102 over the network 104.

When configuration requirements are entered through the central location-provided Web service interface 108, a tooling phase 112 may take place in which the updating and storing of the configuration requirements are automated. During the tooling phase 112, the configuration requirements may be compiled into a specific configuration file. This configuration file may then be served to the central location server 102 by the Web service interface 108.

The example architecture 100 can also be described in terms of two other phases, the configuration phase 114 and the run-time phase 116. In one example, during the configuration phase 114, the central location server 102 may receive, validate, and store the business-specific configuration information entered by the entity 106. Additionally, during the configuration phase 114, the central location server 102 may serve the configuration information to the appropriate service 110. In another example, during the run-time phase 116, the services 110 may receive the configuration information that applies to them and provide their respective service to the entity 106 for use with a customer of the entity. For instance, using the payment example from above, if a business entity 106 enters a payment configuration that only allows customers to pay with American Express™ (AMEX), the payment service 110 will provide the AMEX only payment option to a customer of the business entity 106 during the run-time phase 116.

Thus, in this example, by separating the example architecture into a tooling phase 112, a configuration phase 114, and a run-time phase 116, the time-sensitive run-time phase 116 can operate fluidly without maintaining the configuration information of every possible business entity 106 for which it provides a service. Additionally, by providing a configuration phase 114 separate from the run-time phase 116, services 110 may control when to update local storage, including cache, with business-specific configuration information, rather than having each configuration change unnecessarily pushed from the central location server 102.

While FIG. 1 illustrates a single business entity 106, the architecture 100 and other architectures may employ any number of business entities 106. For instance, and as noted above, one business entity 106 may employ many different services 110 and, thus, may employ one configuration file for each service 110. However, another business entity 106 may simply employ the services of one service 110 and, thus, may only provide one configuration file. Additionally, while only one network 104 is shown in FIG. 1, any number of networks, whether public or private, can be used to implement this example architecture.

Figure 2:
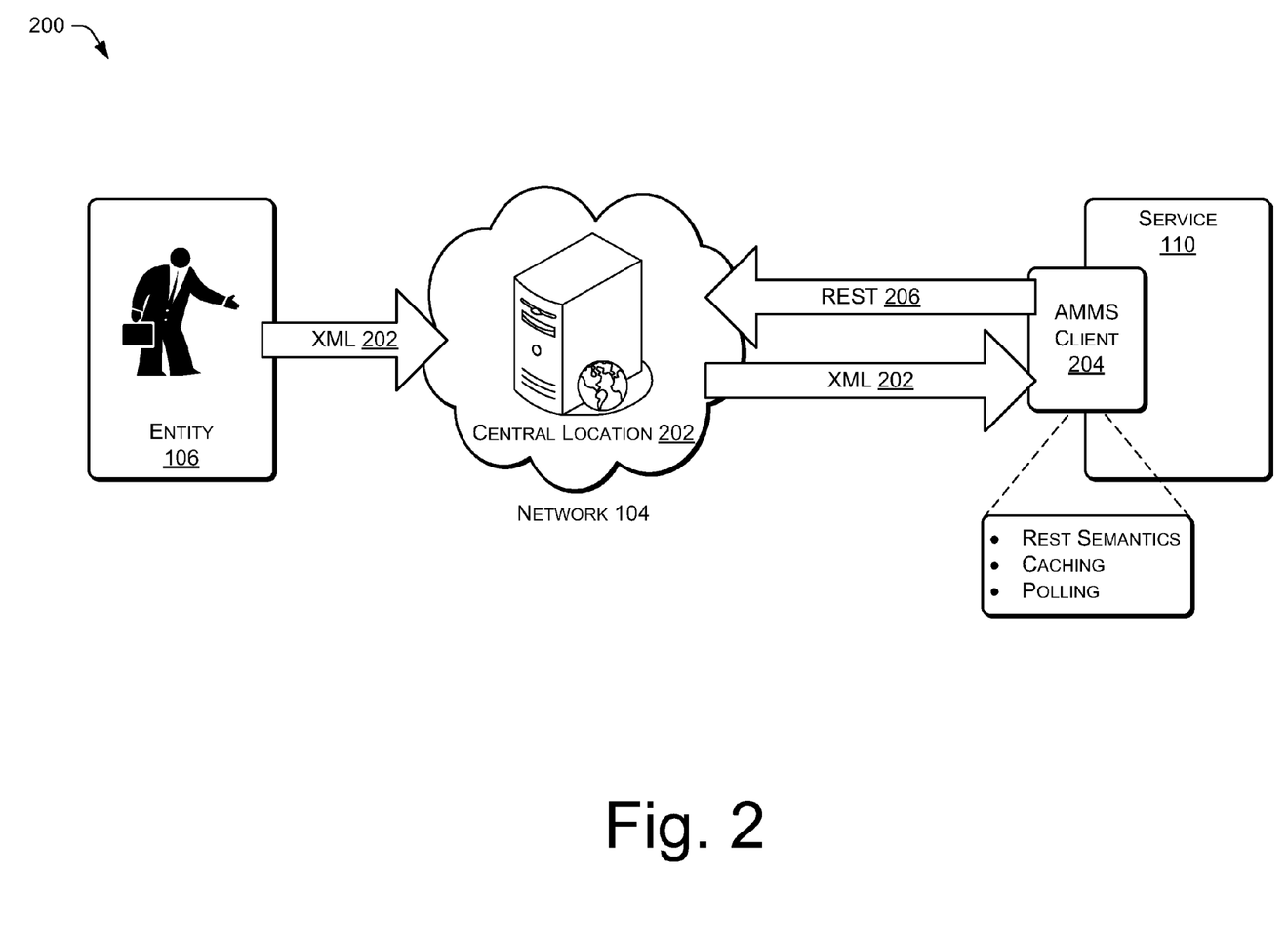
FIG. 2 illustrates an example transaction between the central location and one specific business entity as well as the central location and one specific service. This figure illustrates that an optional client may be used by the service to communicate with the central location and to assist with serving an extensible markup language (XML) file from the business entity to the service through the central location.
Figure 3:
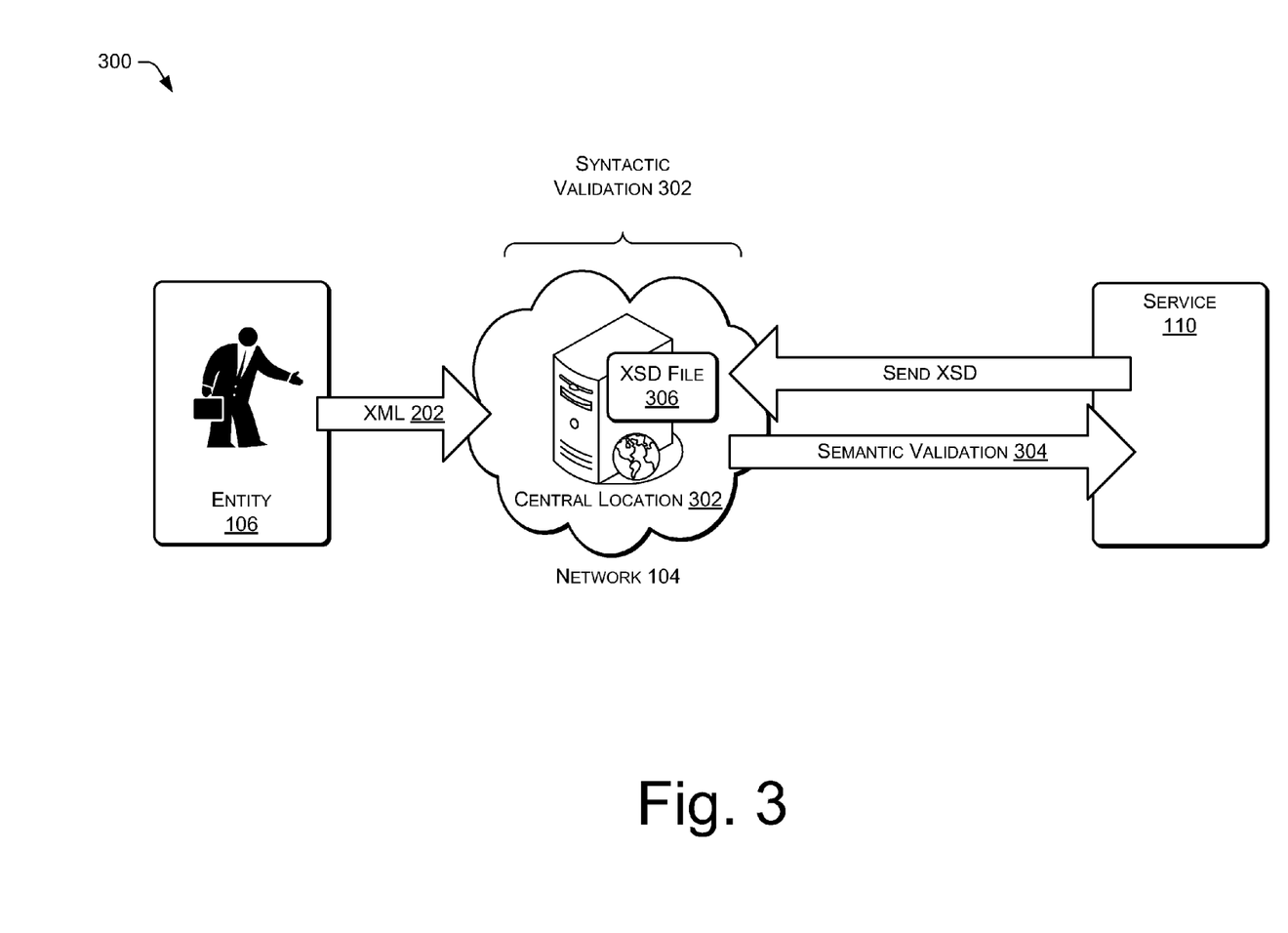
FIG. 3 illustrates another example transaction between the central location and one specific business entity as well as the central location and one specific service. This figure illustrates that the service may serve a schema definition to the central location for syntactic validation of a configuration file and a call-back to the service may be used for semantic validation of the configuration file.

FIGS. 2 and 3 illustrate example architectures 200 and 300 detailing example transactions between a business entity 106 and a central location server 102 as well as between a service 110 and the central location server 102. In one instance, the business entity 106 may provide business-specific configuration information in the form of an XML file 202. As noted above regarding FIG. 1, the configuration information, may be served directly from the business entity 106 or may be tooled by a Web service interface provided by the central location server 102. In the former example, and as shown in FIG. 2, the business entity 106 provides an XML file 202 directly to the central location server 102. In the later example, and as shown in FIG. 1, a Web service interface 108 may convert the configuration information provided by the business entity 106 into an XML file 202 and serve it to the central location server 102 automatically.

In one example, the service 110 may communicate with the central location server 102 via an optional central location client 204. As noted above, the central location client 204 (previously referred to as a management client) may be provided to the service 110 by the central location client 102; however, in other examples the central location client 204 may be created by the service 110 or by another entity. In yet another example, the functionality of the central location client 204 may be fully integrated within the service 110.

In one instance, the central location server 102 includes a representational state transfer (REST) interface. In this case, the central location client 204 may communicate with the central location server 102 using the REST protocol, and may make REST configuration requests 206 based on logic implemented by the central location client 204. For example, and as discussed above, when a customer of a particular business entity 106 attempts to purchase an item, the payment service 110 may need to determine the payment configuration for that particular business entity 106. As such, based on logic implemented by the central location client 204, the central location client 204 may first check a local cache for the configuration information. If the information is not stored locally (i.e., the information is not cached), a REST configuration request 206 may be sent to the central location server 102. In response to the request, assuming the XML file 202 from the particular business entity 106 has been validated, the central location server 102 may serve the XML file 202 to the service 110 by serving the XML file 202 to the central location client 204 over the network 104. Alternatively, when no central location client 204 is used, the XML file 202 may be served directly to the service 110 over the network 104. In either case, once received, the service 110 may cache the XML file 202 locally.

As described above, the central location client 204 may be configured to communicate with the central location server 102 using the REST protocol and may be configured with logic for determining when to use cached configuration information and, alternatively, when to make REST requests 206 to the central location server 102. Additionally, the central location client 204 may also be configured to listen to (or poll) the central location server 102 for changes to specific XML files 202. For instance, and as discussed above, certain services 110 may be performance critical and may request that configurations be received as soon as they are updated, or at specific time intervals. One such example of a performance critical service may be a search service. As such, the central location client 204 may facilitate polling the central location server 102 for a search service 110 every hour (for example only) to determine whether a change has been made to an XML file 202 corresponding to an entity 106 that utilizes the search service 110. Other performance critical services 110 may also poll the central location server 102 as well, either through logic implemented by the service 110 or through logic implemented by the central location client 204. Another example of a performance critical service may be a free two-day shipping (FTDS) service 110. In this example, a flag may be set for each product offer made by each business entity 106 that uses the FTDS service 110. As such, the central location client 204 used by the FTDS service 110, or the FTDS service 110 itself, may want to poll the central location server 102 every minute (for example only) to determine whether any XML files 202 have been updated with that particular flag set. If so, the FTDS service 110 may be updated before a purchase is made so that the correct steps are taken to ensure that the customer receives their product within two days.

FIG. 3 illustrates syntactic validation 302 and semantic validation 304 of an XML file 202. As noted above, the central location server 102 may validate each XML file 202 prior to serving it to the appropriate service 110 or the central location client 204. For instance, syntactic validation 302 may validate whether the XML file 202 conforms to the proper syntax employed by each service 110. Additionally, in one example, this service-specific syntax can be stored in an XSD file 306. In other words, syntactic validation 302 may determine whether the business entity 106 that submitted the XML file 202 (or the configuration information) selected a configuration that syntactically matches what the service 110 allows (i.e., what is stored in the XSD file 306). In one example, an XML file 202 may contain configuration information about shipping requirements. The business owner 106 may have selected to allow global shipping for its customers. However, a shipping service provider 110 may only provide shipping services to ten countries. When the XML file 202 is cross-referenced against the XSD file of the shipping service 110, it will not be validated by the central location server 102. Alternatively, using the payment example again, if a payment service 110 provides an XSD listing VISA™, Mastercard™, and AMEX as acceptable payment options, an XML file that indicates that customers may purchase products using VISA™ or Mastercard™ will be syntactically validated because VISA™ and Mastercard™ match the XSD schema requirements.

In one instance, an XSD file 306 may be provided to the central location server 102 by a service 110 communicating with the central location server 102 for the service 110. The XSD file 206 may be stored at the central location server 102 for actively validating each XML file 202 that is received. In this way, a single, centralized location may be responsible for managing the XSD files 306, the XML files 202, and the syntactic validation 304 of each XML file 202. Additionally, this may help ensure that each piece of configuration information that the central location server 102 serves to each service 110 is syntactically correct.

FIG. 3 also illustrates semantic validation 304 of XML files 202. Semantic validation 304 may validate whether the XML file 202 conforms to the proper semantics required by each service 110. This semantic validation 304 may be performed via a call-back to a respective service 110. In this way, specific words may be cross-checked with specific services 110. In other words, semantic validation 304 may determine whether the business entity 106 that submitted the XML file 202 (or the configuration information) selected a configuration that semantically matches what the service 110 allows. In one example, an XML file 202 may contain configuration information about a marketplace name. However, the marketplace name may be inappropriate or not politically correct (PC). Thus, this type of service may not allow such a marketplace name to be used by a business entity 106. As such, the non-PC marketplace name would not be semantically validated 304.

As noted above, the architectures and transactions illustrated in FIGS. 2 and 3 are merely examples, and other transactions and/or configurations are possible. For example, while one business entity 106 and one service 110 is shown, any number of business entities and/or services 110 may be used. Additionally, while the polling examples above described that a search service 110 or an FTDS service 100 may poll the central location server 102 every hour and every day respectively, any other pre-determined, or dynamically changing, time intervals may be used.

Illustrative Operational Planes

Figure 4:
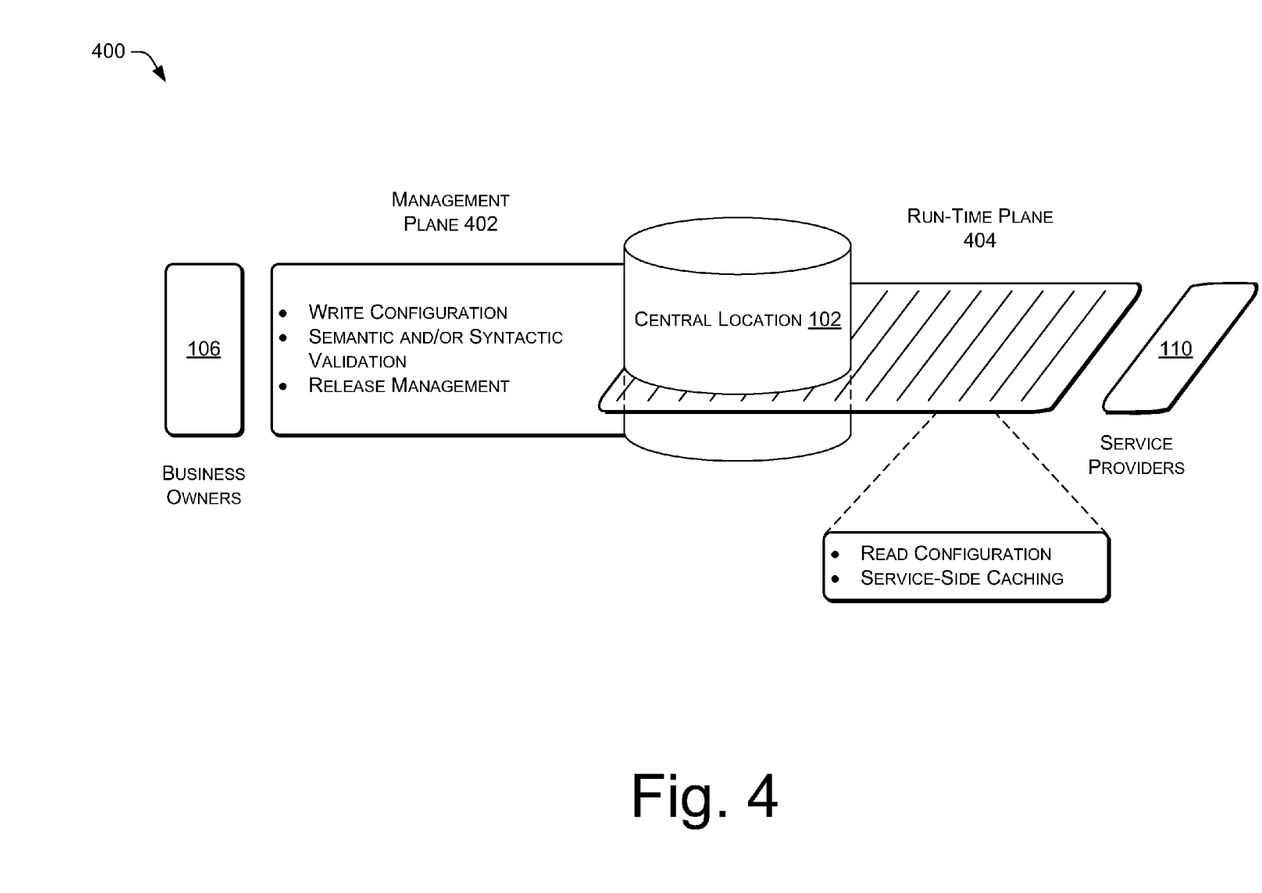
FIG. 4 serves to represent an example of two operational planes that may coexist within the central location. Specifically, this figure illustrates a management plane that business owners may utilize and a run-time plane that service providers may utilize.

FIG. 4 illustrates an example overview of operational planes that may operate simultaneously to effectuate the example architectures described in FIGS. 1-3 above. In one example, business owners 106 may operate in a management plane 402 while service providers 100 may operate in a run-time plane 404. While both planes may operate independently, they may share a common interaction with the central location server 102.

As discussed above, the business owners 106 may be responsible for writing and serving configuration requirements in the management plane 402. In some instances, these configuration requirements may be in the form of an XML file served to the central location server 102. Additionally, semantic and/or syntactic validation may be performed in this plane, thus not interrupting the operation of the service providers in the run-time plane 404. Alternatively, internal protocols may be implemented to validate the XML files rather than relying on schema definitions and call-backs.

In yet another example, business owners 106 may be responsible for updating sets of configuration files together in a single release, rather than updating each configuration file individually. In this way, release management may be tied to the central location 102 and/or may be managed during the management plane 402 by the business owners 106. In one example of release management, a business owner 106 may create a set of configuration files for implementation together. Once created, the central location 102 may identify the set of configuration files as a release (or version) by time-stamping or creating an instance ID (i.e., tagging the configuration files) for the set. Additionally, each release may me chronologically numbered as in "Version 1" through "Version N" for each business owner 106. Additionally, business owners 106 may have different releases for different service providers 110. In other words, a single business owner 106 may create a different set for each of a multitude of different service providers 110 and, as such, may have multiple different "Version 1s."

Additionally, the central location 102 may tie each set of configurations to a particular user's Web session. In this way, a user may be protected from configuration changes that may occur during a session. For example, if shipping charges were to change internally, a user who purchased an item while one version was being implemented would be unaffected by a new version with a higher shipping charge being implemented after the purchase.

Further, release management may be useful when business owners 106 want a set of configuration changes to occur at the same time. For example, if a sale on a products is intended to only last for a particular window of time, a first release may contain configurations for the sale followed by a subsequent release with configurations similar to that implemented prior to the sale. Additionally, by querying the central location 102 periodically for the most updated version, and then requesting the appropriate version, service providers 110 may avoid communicating with one another with conflicting versions for the same business owner 106.

In other examples, as part of the run-time plane 404, service providers 110 may read configuration files from the central location server 102. As discussed above, during the run-time plane 404, the business owners 106 may serve XML files to the service providers 110 based on a either a push or a pull command. Additionally, in this plane, the service providers 110 may perform service-side caching by implementing logic to appropriately cache configuration information that tends to be updated frequently. This may reduce the number of times the service providers 110 may go off-box. As discussed above, the central location client 102 may facilitate such service-side caching.

Figure 5:
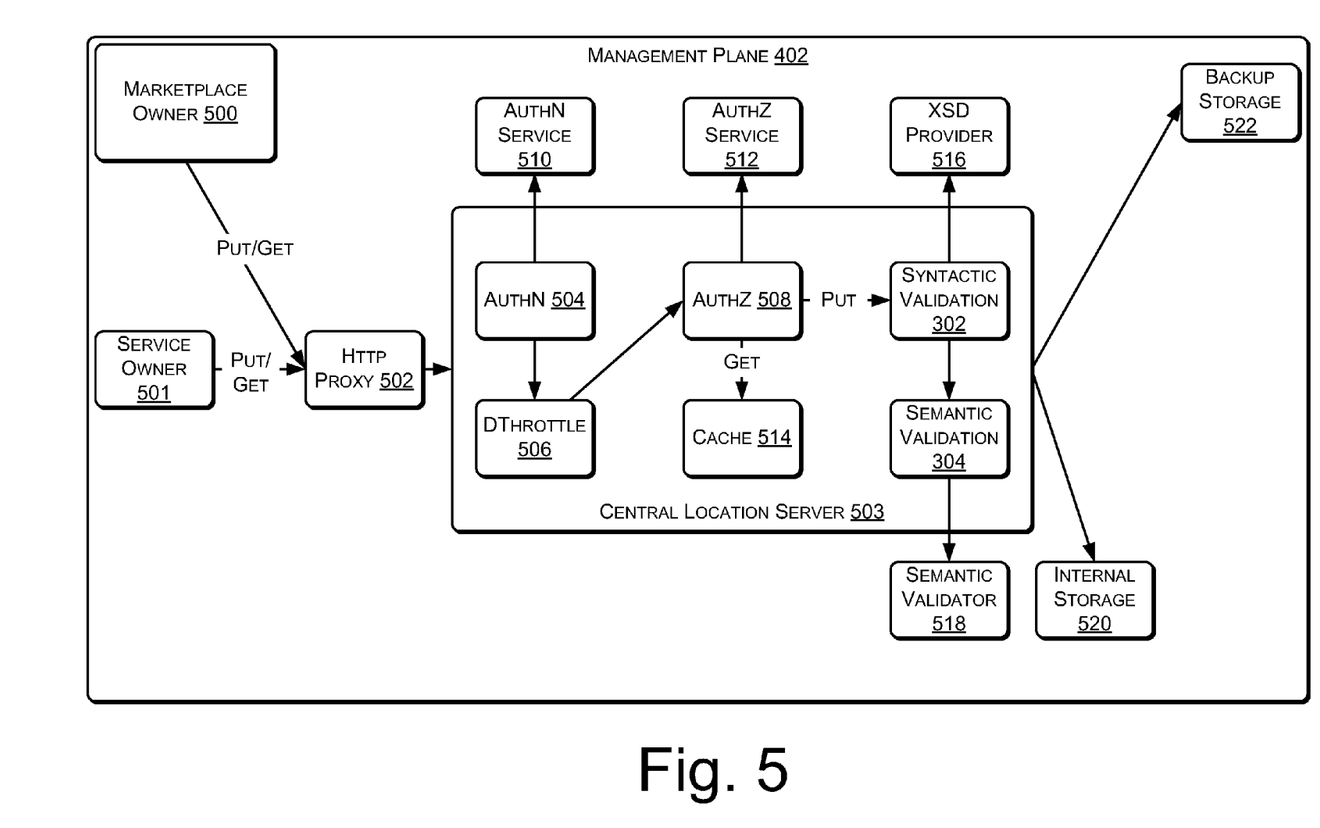
FIG. 5 illustrates an example management plane as shown in FIG. 4.

FIG. 5 illustrates a detailed example of the management plane 402 as described above with reference to FIG. 4. In this illustration, and by way of example only, both marketplace owners 500 and service owners 501 connect to an HTTP proxy 502 for performing "puts" and "gets" (i.e., writes and redirects) for requests of the central location server 503. Once a request has entered a central location server 503, authentication 504, data throttling 506, and authorization 508 may be performed. In one example, an external authentication service 510 may perform the authentication 504 and an external authorization service 512 may perform the authorization 508. In this case, the external authentication service 510 may be able to perform service-to-service authentication. In yet another example, the central location server 503 may perform authentication 504 and/or authorization 508 internally. Additionally, the central location server 503 may perform authorization 508 on individual resources or on collections of resources (e.g., directories). For instance, a business owner 500 may configure access control in such a way that a business owner 500 may restrict access to a set of configuration files, to specific configuration files, or to both.

Figure 6:
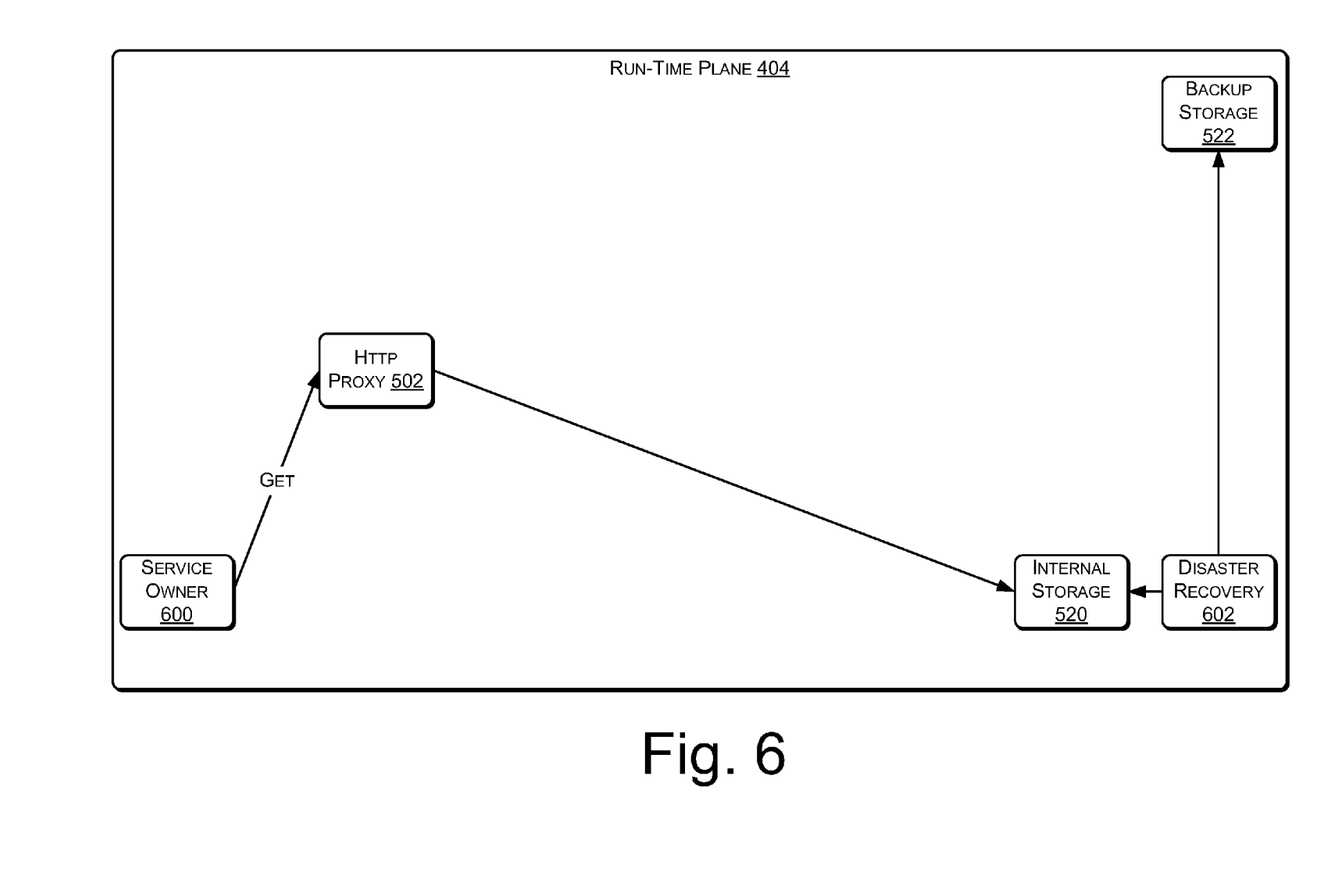
FIG. 6 illustrates an example run-time plane also as shown in FIG. 4.

In some instances, the request may be a "get" command, in which case the central location server 503 may search the local cache to determine whether a local copy exists. On the other hand, if the request is a "put" command, the central location server 503 may be configured to run syntactic validation 302 and semantic validation 304. As discussed above, syntactic validation 302 may validate an XML file based on an XSD file stored locally within the central location server 503, or alternatively, provided by an XSD provider 516. Additionally, semantic validation 304 may validate an XML file based on a call-back to a semantic validator 518 (e.g., the service owner 501). Finally, the request may be stored in any number of persistence mechanisms. In one example, two different persistence mechanisms may be used, internal storage 520 and backup storage 522; however, in other examples, more or less persistence mechanisms may be used. In still another example, backup storage 522 may be an exact duplicate of internal storage 520. Although internal storage 520 is shown outside of the central location server 503, it may alternatively reside within the central location server 503. FIG. 6 illustrates a detailed example of the run-time plane 404 as described above also with reference to FIG. 4. In this illustration, and by way of example only, a service owner 600 connects to the HTTP proxy 502 for performing "get" commands. In one instance, the service owner 600 may be an internal trusted service and may, therefore, only be able to read files from the central location server 503. As such, the run-time plane 404 may offer much faster speeds than the management plane 402 because no access controls are implemented and the service owner 600 may not allow "puts" (i.e., data writes). Additionally, the request may cause the central location server 503 to serve the configuration information to the service owner 600 from the internal storage 520. As noted above with respect to FIG. 5, the backup storage 522 may be an exact duplicate of the internal storage 520. In this way, if the data in either internal storage 520 or backup storage 522 is lost or corrupt, disaster recovery 602 may replicate the data in one from the other.

Illustrative Computing Device

Figure 7:
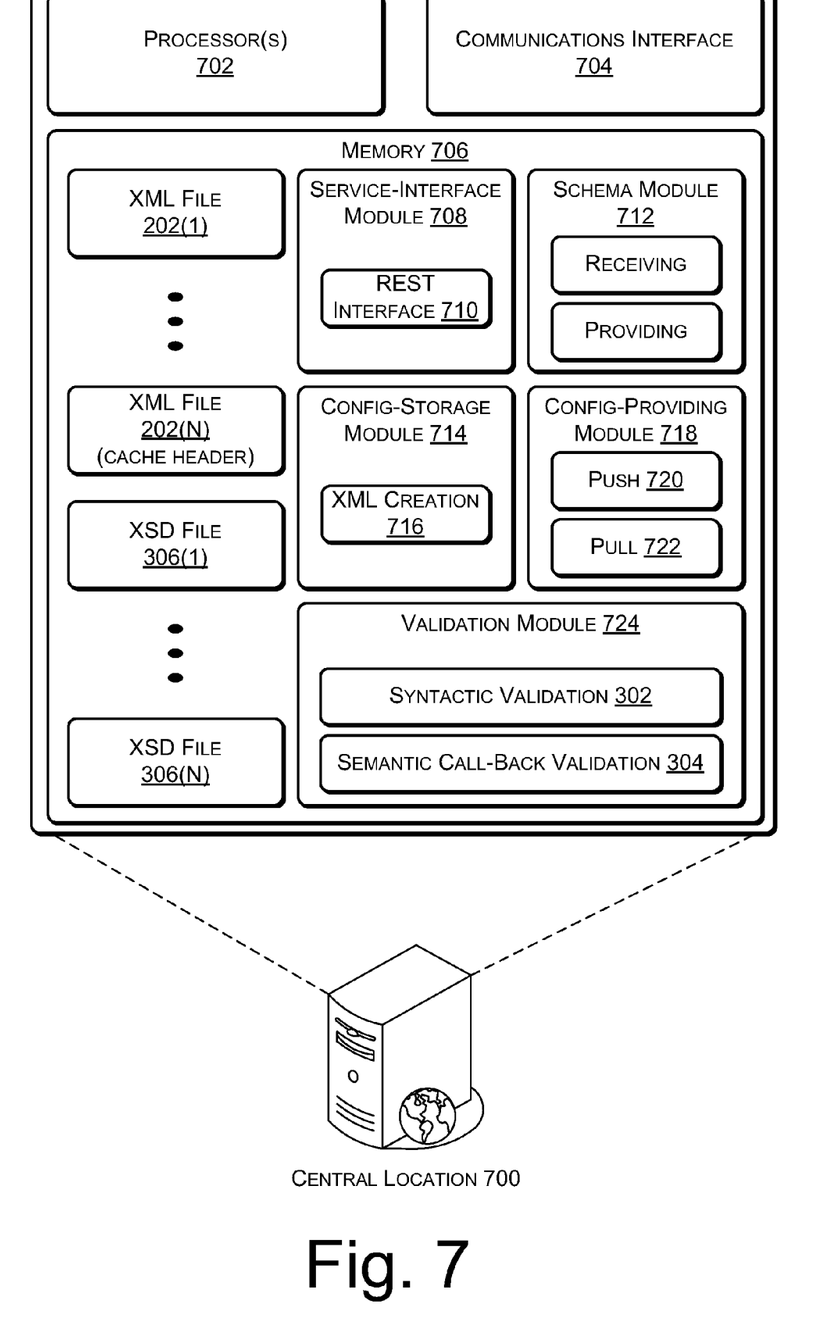
FIG. 7 illustrates an example computing device capable of implementing the techniques discussed above with reference to the architecture shown in FIGS. 1-3.

FIG. 7 illustrates an example computing device 700 that might be configured to implement the functions and features of the central location server, as described above. In a very basic configuration, the computing device 700 may include one or more processors 702, a communications interface 704, and memory 706. Depending on the configuration of the computing device 700, the memory 706 is an example of computer storage media and may include volatile and non-volatile memory. Thus, the memory 706 may include, but is not limited to, RAM, ROM, EEPROM, flash memory, or other memory technology, or any other medium which can be used to store media items or applications and data which can be accessed by the computing device 700.

The memory 706 may be used to store any number of functional components that are executable on the processor(s) 702, as well as data and content items that are rendered by the computing device 700. Thus, the memory 706 may store an operating system, XML files 202(1)-202(N) provided by business owners, XSD files 306(1)-306(N) provided by services, and several modules containing logic.

A service-interface module 708 located in memory 706 and executable on the processor(s) 702 may also facilitate communication between a central server and the services. The service-interface module 708 may also provide a REST interface 710 such that the communication between the central server and the services follows the REST protocol. In some instances, requests for configuration files may be made by the services through the REST interface 710.

The memory 706 may further store a schema module 712 to receive a schema definition file, such as an XSD file, from a service and/or to provide a schema definition file to a service. As noted above, the XSD file may define the syntactic requirements placed on business-owner configuration files by the service.

The memory 706 may also store a configuration-storage module 714 to facilitate storage and maintenance of configuration information. In one instance, configuration-storage module 714 may also provide XML creation 716 for instances when business owners do not provide an XML file. In these instances, XML creation 716 may create an XML file containing the configuration information input by the business owners into a Web service interface.

The computing device 700, in one configuration, may also include a configuration-providing module 718 stored in the memory 706 and executed on the processor(s) 702 responsible for serving the configuration information to the services when needed. In some instances, the configuration information may be sent directly to the services in the form of a "push" command 720 without the service requesting the information or in response to a notification of an updated configuration file. Alternatively, in other instances, the configuration information is served to the service in the form a "pull" command 722. In this instance, the service will make a request (i.e., the "pull") and the configuration-providing module 718 will serve the configuration information responsive to the request.

Additionally, the memory 706 may store a validation module 724 to facilitate validating the XML files provided by the business owners. In one instance, the validation module 724 may perform syntactic validation 302 and in another instance, it may perform semantic validation 304 as described with reference to FIG. 3. In yet another instance, the validation module 724 may perform both syntactic validation 302 and semantic validation 304 on one XML file.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer readable storage media.

Illustrative Process

Figure 8:
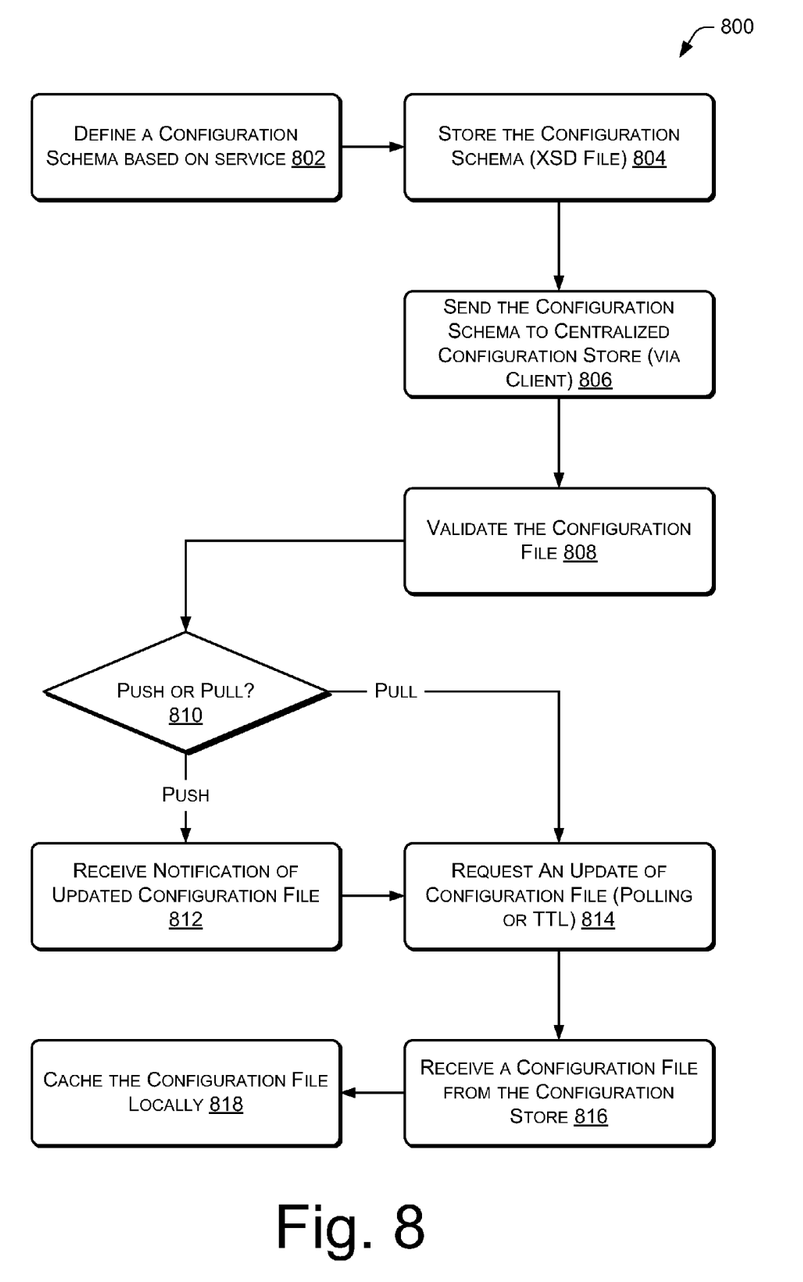
FIG. 8 illustrates an example flow diagram of a process for implementing a central location that maintains a configuration file. Here, a service provider serves a schema definition to the central location and the central location serves updated configuration files to the service provider based on the schema definition and a push or pull command.

FIG. 8 illustrates an example flow diagram of process 800 for implementing a centralized configuration store 102 for maintaining multiple business-specific configuration files and service-specific schema definition files, as discussed above.

The process 800 includes a service provider 110 defining a configuration schema definition based on a particular service provided by the service provider 110 at 802. At 804, the service provider 110 stores the configuration schema definition in memory. In some instances, as noted above, this schema definition may be in the form of an XSD file. At 806, the service provider 110 serves the configuration file to the centralized configuration store 102. As noted above, the service provider 110 may utilize a management client to communicate with, and send the schema file to the centralized configuration store 102. At 808, the centralized configuration store 102 validates a configuration file from a business owner. In one instance, the validation is based at least in part on the schema definition stored at the centralized configuration store 102. In yet another instance, the validation is based at least in part on a call-back from the centralized configuration store 102 to the service provider 110 that provided the schema definition file.

At 810, the centralized configuration store 102 may determine whether a push or pull command is to be performed. If the central configuration store 102 is to perform a push at 810, the service provider 110 may receive a notification of an updated configuration file from a business entity at 812. In one instance, the configuration file may be an XML file. At 814, the service provider 110 may request an update of a configuration file from the centralized configuration store 102 based at least in part on the notification of the updated configuration file. On the other hand, the service provider 110 may request an update of a configuration file from the centralized configuration store 102 at 814 independent of the notification received at the centralized configuration store 102. In this instance, the centralized configuration store 102 may wait to serve the configuration file until it receives the request from the service provider 110. Additionally, the timing of the request for the updated configuration file may be based on polling the centralized configuration store 102 or based on caching logic and TTL data, as discussed above. At 816, the service provider 110 may receive the configuration file from the centralized configuration store 102. At 818, the service provider 110 may cache the configuration file locally.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:

under control of one or more computer systems configured with executable instructions, providing, by a centralized server, a Web service interface accessible through a computer-accessible network to a plurality of business entities that offer products for sale to multiple individuals, the products offered for sale using the centralized server;

providing a client application to a service provider of a plurality of service providers, the service provider providing a plurality of services to the plurality of business entities, the plurality of services including a payment processing service;

receiving, through the Web service interface, a plurality of configuration files, each configuration file of the plurality of configuration files corresponding to a business entity of the plurality of business entities;

receiving a configuration schema from the service provider;

performing syntactic validation on each configuration file received from the corresponding business entity;

performing semantic validation on each configuration file;

configuring, by the centralized server, the one or more services for each of the plurality of business entities based on the corresponding configuration file;

maintaining the plurality of configuration files in a memory of the centralized server; and providing the plurality of configuration files to the client application of the service provider to enable the service provider to provide one or more services from the plurality of services to one or more of the plurality of business entities based at least partially on the corresponding configuration file.

2. A method as recited in claim 1, wherein the providing of the client application to the service provider comprises sending software code to be executed locally at the service provider to enable the service provider to update the corresponding configuration file.

3. A method as recited in claim 1, wherein each configuration file contains options for customer interaction with the corresponding business entity.

4. A method as recited in claim 1, wherein the receiving of each configuration file from the corresponding business entity comprises receiving an extensible markup language (XML) file.

5. A method as recited in claim 1, wherein the receiving of the configuration schema from the service provider comprises receiving an extensible markup language schema definition (XSD) file that defines a structure of the configuration file employed by the service provider.

6. One or more non-transitory computer-readable media storing computer-executable instructions that, when executed, cause one or more processors to perform acts comprising:

providing, by at least one server, a Web service interface to multiple merchant entities, each merchant entity of the multiple merchant entities to offer a catalog of items for acquisition by multiple individuals, the catalog available for browsing on a site hosted by the server;

receiving, by the at least one server, a configuration schema from a service provider, the configuration schema specifying one or more services provided by the service provider to the multiple merchant entities, the one or more services associated with acquiring an item from the catalog;

receiving, by the at least one server, multiple configuration information from the multiple merchant entities through the Web service interface, each configuration information of the multiple configuration information corresponding to a merchant entity of the multiple merchant entities, each configuration information used by the at least one server to configure the one or more services for the corresponding merchant entity;

validating the configuration information corresponding to each of the merchant entities;

maintaining the multiple configuration information in a memory of the at least one server; and providing the multiple configuration information to the service provider to enable the service provider to provide at least one of the one or more services to one or more of the multiple merchant entities based at least partially on the corresponding configuration file.

7. One or more non-transitory computer-readable media as recited in claim 6, wherein:

each configuration information is received within a configuration file that is specific to the corresponding merchant entity that provides the configuration file; and each configuration file includes options for customer interaction with the corresponding merchant entity.

8. One or more non-transitory computer-readable media as recited in claim 7, wherein the options comprise at least one of identity verification options, payment processing options, ordering options, product return options, promotion options, customer review options, customer service options, fulfillment options, fee options, fraud service options, searching options, shipping options, tax collection options, or browsing options.

9. One or more non-transitory computer-readable media as recited in claim 6, wherein the receiving each of the configuration information from the corresponding merchant entity comprises receiving updated configuration information that includes changed configuration information or both changed and unchanged configuration information.

10. One or more non-transitory computer-readable media as recited in claim 6, wherein the validating the corresponding configuration information comprises:

receiving a definition file associated with a corresponding merchant entity of the multiple business entities from the service provider;

comparing the corresponding configuration information with the definition file to determine if the configuration file is syntactically valid;

returning a determination that the corresponding configuration information is syntactically valid when data in the corresponding configuration information is determined to be syntactically correct based at least in part on the comparing; and returning a determination that the corresponding configuration information is syntactically invalid when data in the corresponding configuration information is determined to be syntactically incorrect based at least in part on the comparing.

11. One or more non-transitory computer-readable media as recited in claim 10, wherein the validating the corresponding configuration information further comprises:

providing a call-back to the service provider indicating that the corresponding configuration information has been received; and receiving validation from the service provider that the corresponding configuration information in semantically valid based at least in part on local rules or definitions of the service provider.

12. One or more non-transitory computer-readable media as recited in claim 6, wherein the validating of the corresponding configuration information comprises:
providing a call-back to the service provider indicating that the corresponding configuration information has been received; and
receiving validation from the service provider that the corresponding configuration information is semantically valid based at least in part on local rules or definitions of the service provider.

13. One or more non-transitory computer-readable media as recited in claim 6, wherein the providing of the multiple configuration information comprises:
receiving a request from the service provider to update a corresponding configuration file based at least in part on a cache header; and
transmitting the corresponding configuration information to the service provider at least partly in response to the request.

14. One or more non-transitory computer-readable media as recited in claim 6, wherein the providing of the multiple configuration information comprises transmitting an event notification or an XML file to the service provider based at least in part on an event queue.

15. One or more non-transitory computer-readable media as recited in claim 6, the acts further comprising tagging a set of configuration information.

16. One or more non-transitory computer-readable media as recited in claim 6, the acts further comprising tying a set of configuration information to a session associated with one of the individuals.

17. A system comprising:
one or more processors;
memory accessible by the one or more processors;
a service-interface module, stored in the memory and executable on the one or more processors, to interface with a service provider;
a schema module, stored in the memory and executable on the one or more processors to:
receive a configuration schema from the service provider, or
provide the configuration schema to the service provider, the configuration schema identifying one or more services offered by the service provider in connection with acquiring goods from a catalog, the one or more services including a payment processing service or a fulfillment service;
a validation module, stored in the memory and executable on the one or more processors to:
determine whether an entity-specific configuration file of a plurality of configuration files corresponding to a plurality of business entities is valid based at least in part on the configuration schema, each business entity of the plurality of business entities offering items for consumption by multiple individuals, and
in response to determining that the entity-specific configuration file is valid, configuring the one or more services based on the entity-specific configuration file, the configuration file codifying a set of business rules;
a configuration-storage module, stored in the memory and executable on the one or more processors to store the entity-specific configuration file after the entity-specific configuration file has been validated by the validation module; and
a configuration-providing module, stored in the memory and executable on the one or more processor to provide the entity-specific configuration file to the service provider.

18. A system as recited in claim 17, wherein the validation of the entity-specific configuration file comprises determining if the entity-specific configuration file is syntactically valid based at least in part on a schema definition.

19. A system as recited in claim 17, wherein the validation of the entity-specific configuration file comprises a call-back to the service provider to determine if the entity-specific configuration file is semantically valid based at least in part on a rule stored at the service.

20. A system as recited in claim 17, wherein the configuration-providing module pushes an event notification or the stored configuration file to the service provider based at least in part on an event stream that specifies that the configuration file has changed.

21. A system as recited in claim 17, wherein the configuration-providing module receives a request from the service provider to transmit the configuration file to the service provider, and wherein the configuration-providing module transmits the configuration file to the service provider in response to the request.

22. A system as recited in claim 11, wherein the request is based at least in part on a time to live (TTL) setting determined by the service.

23. A system as recited in claim 11, wherein the request is based at least in part on a cache header stored in the configuration file.

24. The method as recited in claim 1, wherein the client application communicates with the centralized server using a representational state transfer (REST) protocol.

25. The method as recited in claim 1, further comprising:
cross-referencing the configuration file with the configuration schema to determine whether the one or more services offered by the service provider correspond to the services being configured by the configuration file.

26. The method as recited in claim 25, further comprising:
in response to determining that at least one service of the one or more services offered by the service provider do not correspond to the services being configured by the configuration file, sending a notification to the corresponding business entity that the at least one service is unavailable from the service provider.

27. The method as recited in claim 25, further comprising:
including in the notification a recommendation of a second service provider that provides the at least one service.

28. The method as recited in claim 1, where the plurality of services include one or more of an identity verification service, an ordering service, a product return service, a promotion service, a customer review service, a fraud prevention service, a search service, a shipping service, a tax collection service, or a catalog browsing service.

29. A server comprising:
one or more processors; and
one or more storage media to store instructions that are executable by the one or more processors to perform acts comprising:
receiving a plurality of configuration schema from a plurality of service providers, each configuration schema of the plurality of configuration schemas offering multiple services to a plurality of business entities;

receiving a configuration file from a business entity of the plurality of business entities, the configuration file comprising a selection of a portion of the multiple services offered by at least one service provider of the plurality of service providers, each business entity of the plurality of business entities offering a corresponding catalog of items for acquisition to a plurality of customers;

determining whether the configuration file is valid by performing syntactic validation and semantic validation;

in response to determining that the configuration file is valid, configuring the portion of the multiple services for the business entity based partly on:
   the configuration file, and
   the configuration schema associated with the at least one service provider;

storing the configuration file in the one or more storage media;

offering, on a website hosted by the server, the corresponding catalog of items that the business entity is offering for acquisition to the plurality of customers, the catalog of items offered based on the configuration file;

in response to receiving, from a customer of the plurality of customers, a request associated with an item from the catalog of items, identifying a service from the portion of the multiple services based on the request; and responding to the request using the service.

* * * * *